United States Patent
Bisaiji et al.

(10) Patent No.: US 8,695,325 B2
(45) Date of Patent: Apr. 15, 2014

(54) EXHAUST PURIFICATION SYSTEM OF INTERNAL COMBUSTION ENGINE

(75) Inventors: Yuki Bisaiji, Mishima (JP); Kohei Yoshida, Gotemba (JP); Mikio Inoue, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 24 days.

(21) Appl. No.: 13/262,506

(22) PCT Filed: Mar. 15, 2010

(86) PCT No.: PCT/JP2010/054729
§ 371 (c)(1),
(2), (4) Date: Sep. 30, 2011

(87) PCT Pub. No.: WO2011/114498
PCT Pub. Date: Sep. 22, 2011

(65) Prior Publication Data
US 2013/0081378 A1 Apr. 4, 2013

(51) Int. Cl.
*F01N 3/00* (2006.01)
(52) U.S. Cl.
USPC .............................. 60/286; 60/301
(58) Field of Classification Search
USPC .................................... 60/286, 301
See application file for complete search history.

(56) References Cited

U.S. PATENT DOCUMENTS

| 6,109,024 | A | 8/2000 | Kinugasa et al. |
|---|---|---|---|
| 2006/0153761 | A1 | 7/2006 | Bandl-Konrad et al. |
| 2007/0028601 | A1 * | 2/2007 | Duvinage et al. ............ 60/286 |
| 2008/0053073 | A1 * | 3/2008 | Kalyanaraman et al. ....... 60/286 |
| 2008/0102010 | A1 * | 5/2008 | Bruck et al. ............... 423/213.2 |
| 2009/0077948 | A1 * | 3/2009 | Mondori et al. ............... 60/285 |

FOREIGN PATENT DOCUMENTS

| JP | A-11-30117 | 2/1999 |
|---|---|---|
| JP | A-2006-512529 | 4/2006 |
| JP | B2-3969450 | 9/2007 |
| JP | A-2009-114879 | 5/2009 |
| JP | A-2009-191823 | 8/2009 |
| WO | WO 2007/141638 A2 | 12/2007 |

OTHER PUBLICATIONS

International Search Report dated Jun. 15, 2010 in International Application No. PCT/JP2010/054729.

* cited by examiner

*Primary Examiner* — Thomas Denion
*Assistant Examiner* — Jason Shanske
(74) *Attorney, Agent, or Firm* — Oliff PLC

(57) ABSTRACT

Inside of an engine exhaust passage, in order from an upstream side, a hydrocarbon feed valve oxidation catalyst exhaust purification catalyst, and $NO_X$ selective reduction catalyst are arranged. By lowering the air-fuel ratio of the exhaust gas flowing into the exhaust purification catalyst by a predetermined period while maintaining it lean, the $NO_X$ is reduced in the exhaust purification catalyst and the $NO_X$ which was not reduced at the exhaust purification catalyst is reduced by the ammonia which is adsorbed at the $NO_X$ selective reduction catalyst. The air-fuel ratio of the exhaust gas flowing into the exhaust purification catalyst is sometimes switched from lean to rich. At this time, the ammonia which was generated at the exhaust purification catalyst is adsorbed at the $NO_X$ selective reduction catalyst.

16 Claims, 13 Drawing Sheets

Fig. 2
(A)
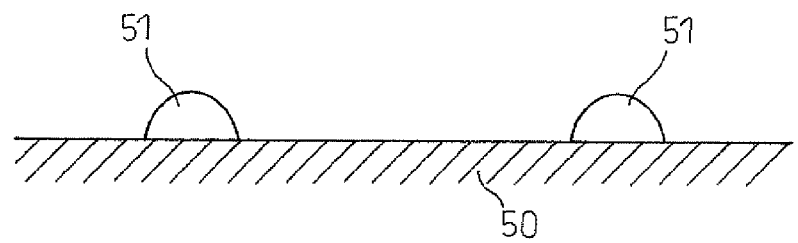
(B)
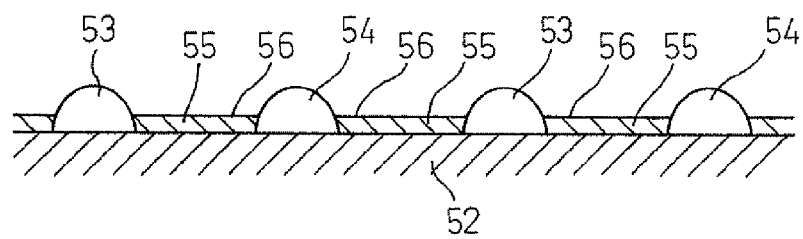
Fig. 3
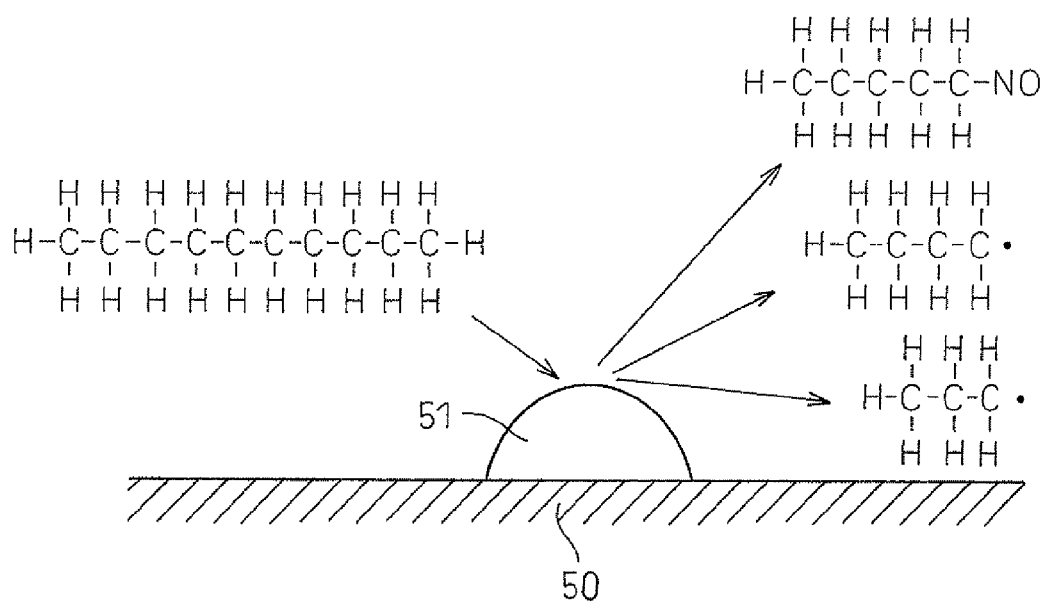

Fig.6
(A)
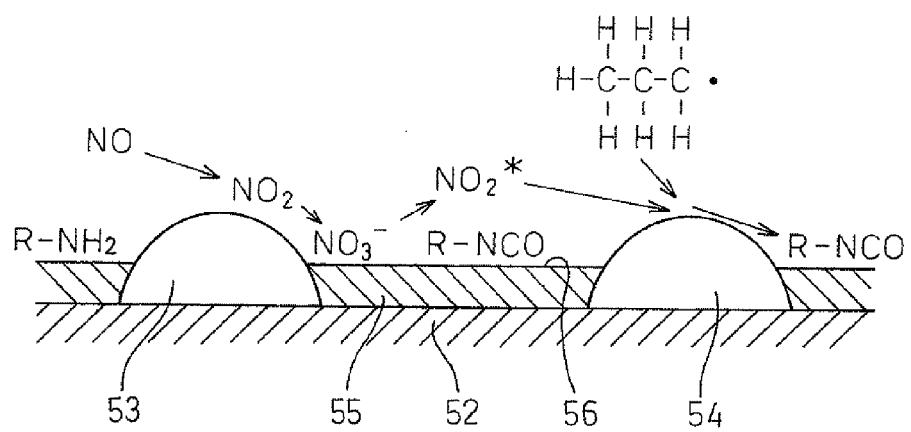
(B)
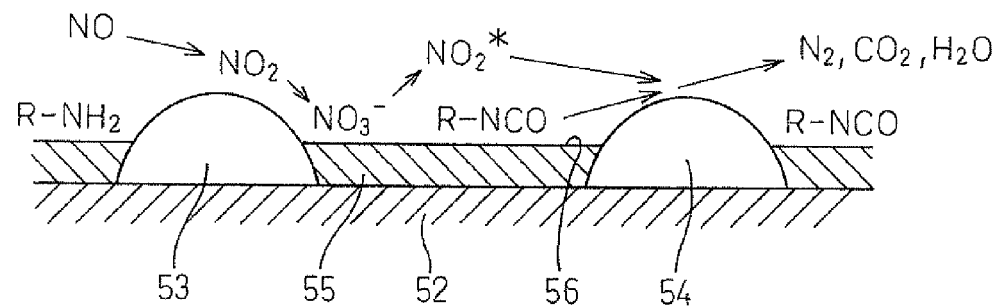

Fig. 7
(A)
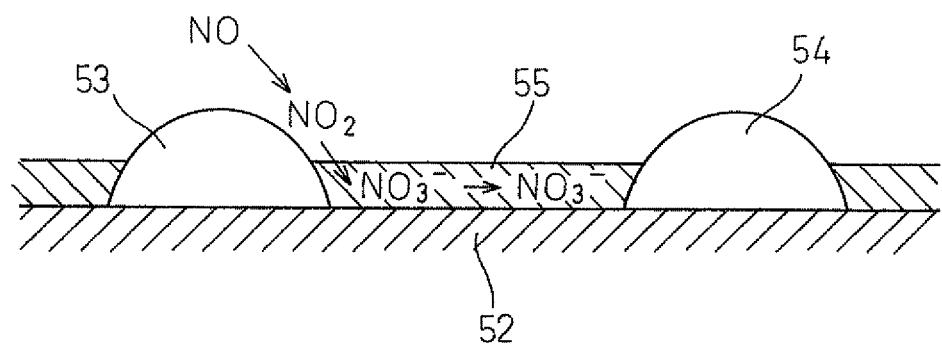
(B)
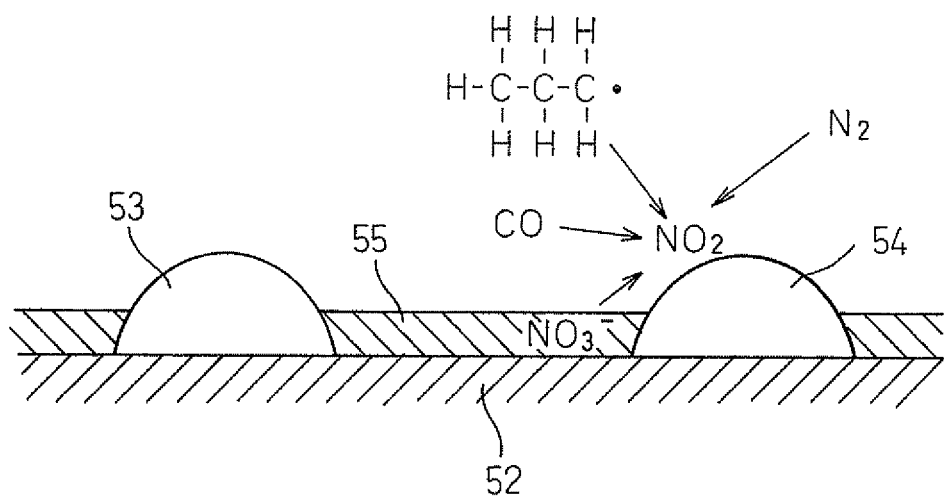

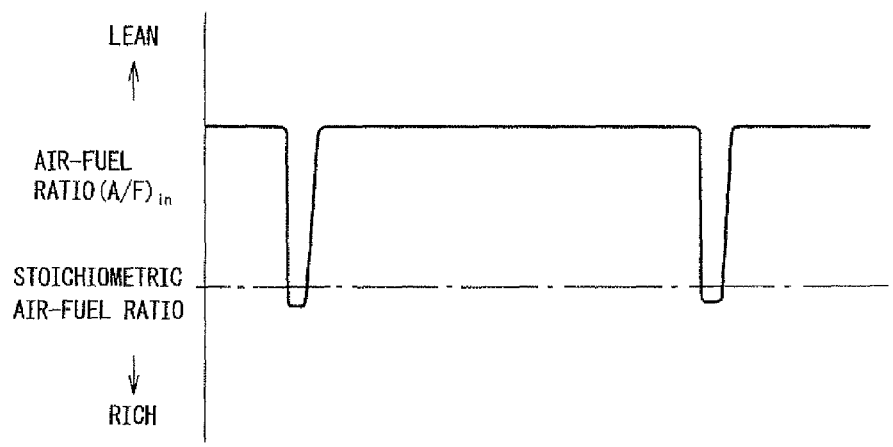
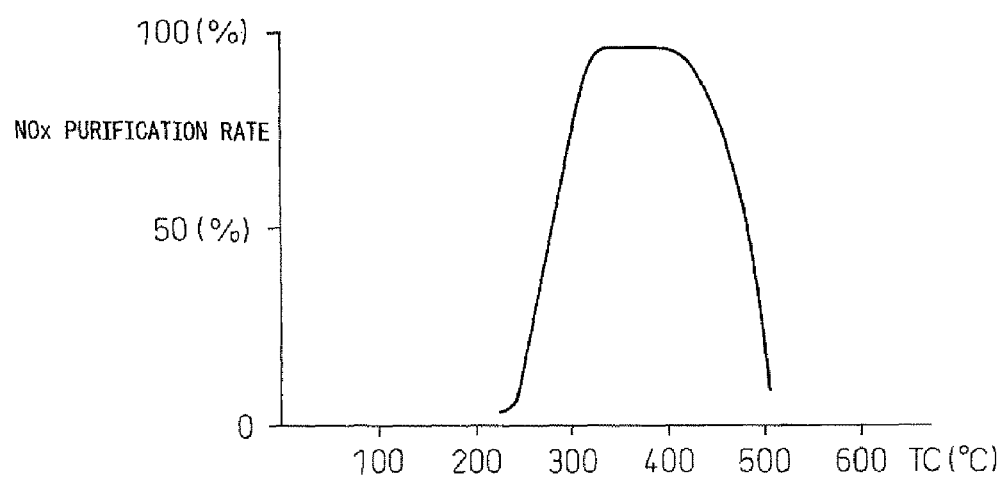

Fig. 20
(A)
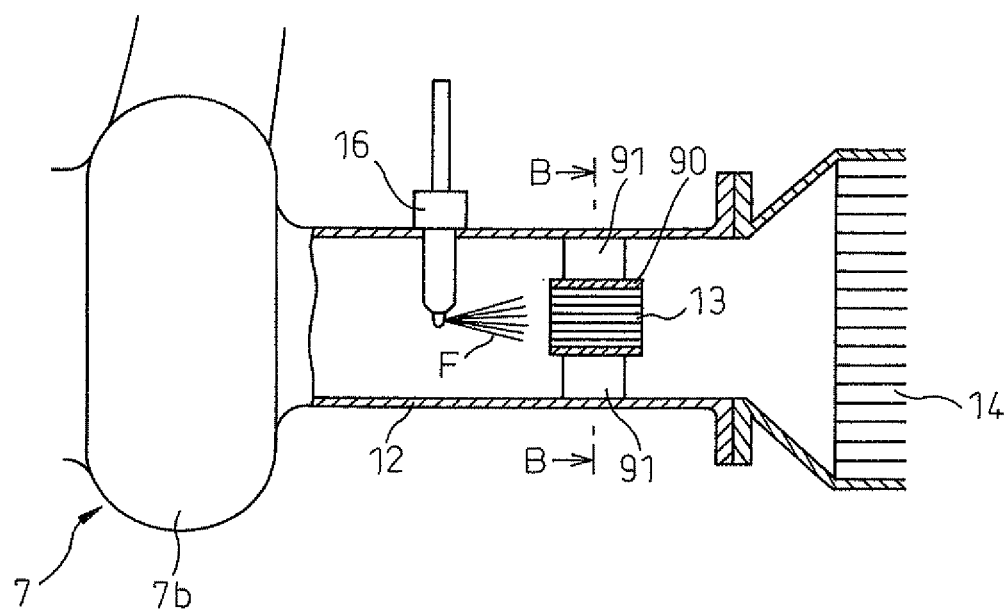
(B)
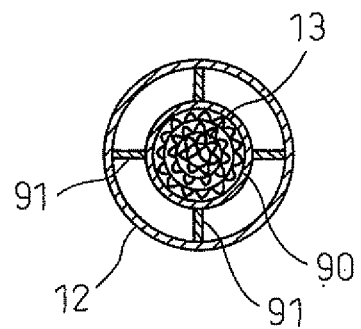

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges, in an engine exhaust passage, an $NO_x$ storage catalyst which stores $NO_x$ which is contained in exhaust gas when the air-fuel ratio of the inflowing exhaust gas is lean and which releases the stored $NO_x$ when the air-fuel ratio of the inflowing exhaust gas becomes rich, which arranges, in the engine exhaust passage upstream of the $NO_x$ storage catalyst, an oxidation catalyst which has an adsorption function, and which feeds hydrocarbons into the engine exhaust passage upstream of the oxidation catalyst to make the air-fuel ratio of the exhaust gas flowing into the $NO_x$ storage catalyst rich when releasing NO from the $NO_x$ storage catalyst (for example, see Patent Literature 1).

In this internal combustion engine, the hydrocarbons which are fed when releasing $NO_x$ from the $NO_x$ storage catalyst are made gaseous hydrocarbons at the oxidation catalyst, and the gaseous hydrocarbons are fed to the $NO_x$ storage catalyst. As a result, the $NO_x$ which is released from the $NO_x$ storage catalyst is reduced well.

CITATION LIST

Patent Literature

Patent Literature 1: Japanese Patent No. 3969450

SUMMARY OF INVENTION

Technical Problem

However, there is the problem that when the $NO_x$ storage catalyst becomes a high temperature, the $NO_x$ purification rate falls.

An object of the present invention is to provide an exhaust purification system of an internal combustion engine which can obtain a high $NO_x$ purification rate even if the temperature of the exhaust purification catalyst becomes a high temperature.

Solution to Problem

According to the present invention, there is provided an exhaust purification system of an internal combustion engine in which a hydrocarbon feed valve for feeding hydrocarbons is arranged inside of an engine exhaust passage, an exhaust purification catalyst for reacting $NO_x$ contained in exhaust gas and hydrocarbons injected from the hydrogen feed valve and partially oxidized is arranged inside of the engine exhaust passage downstream of the hydrocarbon feed valve, a precious metal catalyst is carried on an exhaust gas flow surface of the exhaust purification catalyst and a basic exhaust gas flow surface part is formed around the precious metal catalyst, hydrogen generating means is provided for making air-fuel ratio of an exhaust gas flowing into the exhaust purification catalyst rich and generating hydrogen in the exhaust gas, the exhaust purification catalyst has a property of reducing $NO_x$ contained in exhaust gas if hydrocarbons are injected by a predetermined feed period from the hydrocarbon feed valve in a state where the air-fuel ratio of the exhaust gas flowing into the exhaust purification catalyst is maintained lean and has a property of being increased in storage amount of $NO_x$ contained in exhaust gas if lengthening the feed period of the hydrocarbons from the predetermined feed period, the exhaust purification catalyst also has a property of generating ammonia if hydrogen is fed in a state where the air-fuel ratio of the exhaust gas flowing into the exhaust purification catalyst is rich, an $NO_x$ selective reduction catalyst which adsorbs and holds the ammonia generated at the exhaust purification catalyst is arranged inside of the engine exhaust passage, at the time of engine operation, hydrocarbons are injected from the hydrocarbon feed valve by the above predetermined feed interval while maintaining the air-fuel ratio of the exhaust gas flowing into the exhaust purification catalyst lean, the air-fuel ratio of the exhaust gas flowing into the exhaust purification catalyst is temporarily rich and hydrogen is generated in the exhaust gas by intervals longer than the predetermined feed interval by the hydrogen generating means, and thereby $NO_x$ which is contained in the exhaust gas is reduced at the exhaust purification catalyst and $NO_x$ which could not be reduced at the exhaust purification catalyst is reduced by the ammonia which is adsorbed at the $NO_x$ selective reduction catalyst.

Advantageous Effects of Invention

By reducing the $NO_x$ which is contained in the exhaust gas in the exhaust purification catalyst and further reducing the $NO_x$ which was not reduced in the exhaust purification catalyst in the $NO_x$ selective reduction catalyst, it is possible to obtain a high $NO_x$ purification rate regardless of the engine operating state.

BRIEF DESCRIPTION OF DRAWINGS

FIG. 2 is a view schematically showing a surface part of a catalyst carrier.

FIG. 3 is a view for explaining an oxidation reaction in an oxidation catalyst.

FIG. 6 is a view for explaining an oxidation reduction reaction in an exhaust purification catalyst.

FIG. 7 is a view for explaining an oxidation reduction reaction in an exhaust purification catalyst.

FIG. 8 is a view showing changes in the air-fuel ratio of the exhaust gas flowing to an exhaust purification catalyst etc.

FIG. 9 is a view of an $NO_x$ purification rate.

FIG. 20 is a view for explaining a small-sized oxidation catalyst.

DESCRIPTION OF EMBODIMENTS

Figure 1:
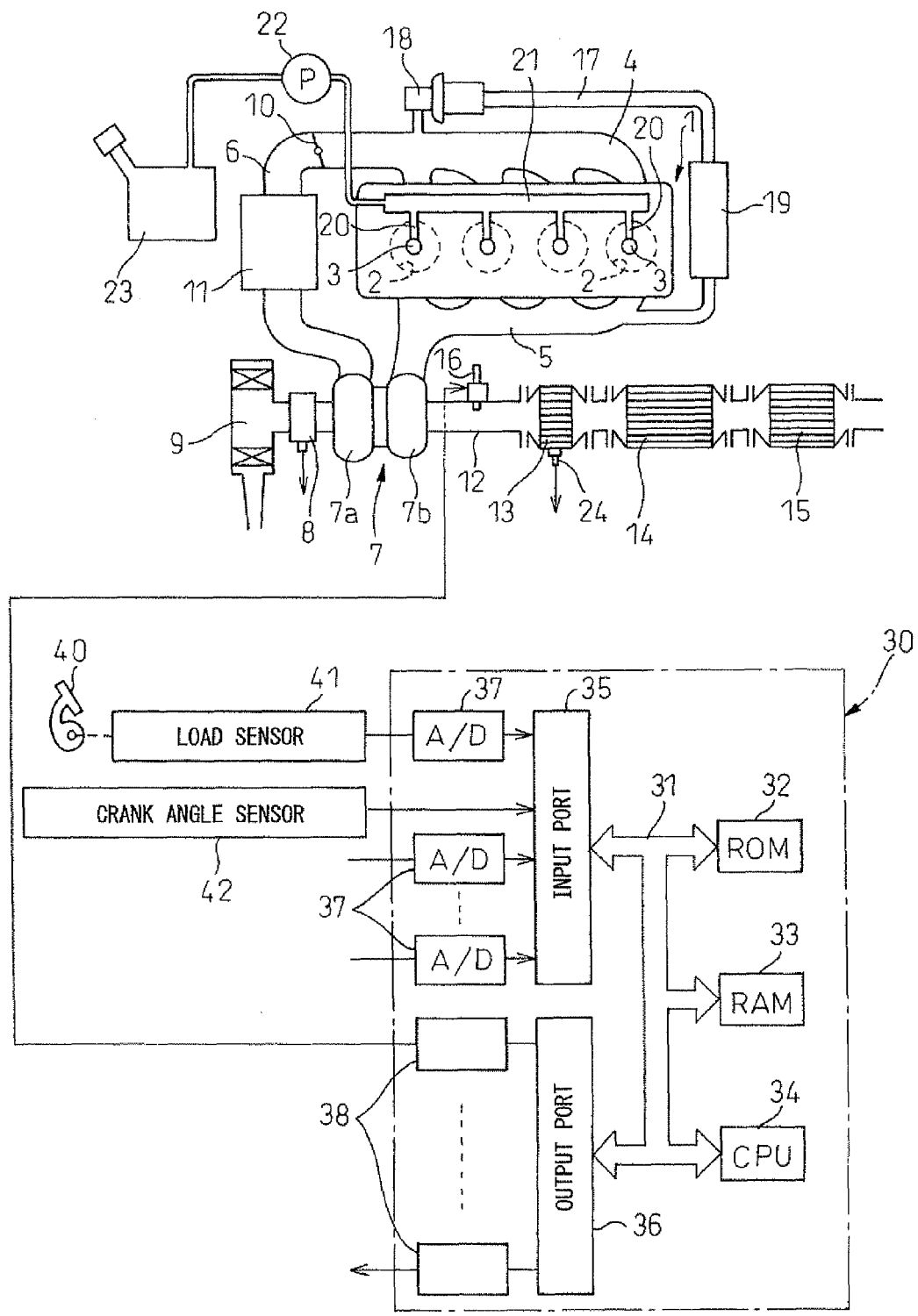
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. The outlet of the exhaust turbine 7b is connected through an exhaust pipe 12 to a hydrocarbon partial oxidation catalyst 13 which is able to partially oxidize the hydrocarbons HC. In the embodiment shown in FIG. 1, this hydrocarbon partial oxidation catalyst 13 is comprised of an oxidation catalyst. An outlet of the hydrocarbon partial oxidation catalyst, that is, the oxidation catalyst 13, is connected to an inlet of an exhaust purification catalyst 14, while the outlet of the exhaust purification catalyst 14 is connected to an $NO_x$ selective reduction catalyst 15 which is able to adsorb and hold the ammonia contained in the exhaust gas. Inside the exhaust pipe 12 upstream of the oxidation catalyst 13, a hydrocarbon feed valve 16 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 16. Note that, the present invention can also be applied to a spark ignition type internal combustion engine in which fuel is burned under a lean air-fuel ratio. In this case, from the hydrocarbon feed valve 16, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 17. Inside the EGR passage 17, an electronically controlled EGR control valve 18 is arranged. Further, around the EGR passage 17, a cooling device 19 is arranged for cooling EGR gas flowing through the inside of the EGR passage 17. In the embodiment shown in FIG. 1, the engine cooling water is guided to the inside of the cooling device 19 where the engine cooling water is used to cool the EGR gas. On the other hand, each fuel injector 3 is connected through a fuel feed tube 20 to a common rail 21. This common rail 21 is connected through an electronically controlled variable discharge fuel pump 22 to a fuel tank 23. The fuel which is stored inside of the fuel tank 23 is fed by the fuel pump 23 to the inside of the common rail 21. The fuel which is fed to the inside of the common rail 21 is fed through each fuel feed tube 20 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. At the oxidation catalyst 13, a temperature sensor 24 is attached for detecting the temperature of the oxidation catalyst 13. The output signals of these temperature sensor 24 and intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, a step motor for driving the throttle valve 10, hydrocarbon feed valve 16, EGR control valve 18, and fuel pump 22.

FIG. 2(A) schematically shows a surface part of a catalyst carrier carried on a substrate of an oxidation catalyst 13. As shown in FIG. 2(A), for example, a catalyst 51 comprised of platinum Pt or another such precious metal or silver Ag or copper Cu or other such transition metal is carried on a catalyst carrier 50 comprised of alumina.

On the other hand, FIG. 2(B) schematically shows a surface part of a catalyst carrier which is carried on a substrate of the exhaust purification catalyst 14. At this exhaust purification catalyst 14, as shown in FIG. 2(B), for example, there is provided a catalyst carrier 52 made of alumina on which precious metal catalysts 53 and 54 are carried. Furthermore, on this catalyst carrier 52, a basic layer 55 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to $NO_x$. The exhaust gas flows along the top of the catalyst carrier 52, so the precious metal catalysts 53 and 54 can be said to be carried on the exhaust gas flow surface of the exhaust purification catalyst 14. Further, the surface of the basic layer 55 exhibits basicity, so the surface of the basic layer 55 is called the basic exhaust gas flow surface part 56.

In FIG. 2(B), the precious metal catalyst 53 is comprised of platinum Pt, while the precious metal catalyst 54 is comprised of rhodium Rh. That is, the precious metal catalysts 53 and 54 which are carried on the catalyst carrier 52 are comprised of platinum Pt and rhodium Rh. Note that, on the catalyst carrier 52 of the exhaust purification catalyst 14, in addition to platinum Pt and rhodium Rh, palladium Pd may be further carried or, instead of rhodium Rh, palladium Pd may be carried. That is, the precious metal catalysts 53 and 54 which are carried on the catalyst carrier 52 are comprised of platinum Pt and at least one of rhodium Rh and palladium Pd.

When hydrocarbons are injected from the hydrocarbon feed valve 16 into the exhaust gas, the hydrocarbons are oxidized on the oxidation catalyst 13. In the present invention, at this time, the hydrocarbons are partially oxidized at the oxidation catalyst 13 and the partially oxidized hydrocarbons are used to remove the $NO_x$ at the exhaust purification catalyst 14. In this case, if making the oxidizing strength of the oxidation catalyst 13 too strong, the hydrocarbons end up being oxidized without being partially oxidized at the oxidation catalyst 13. To make the hydrocarbons partially oxidize, it is necessary to weaken the oxidizing strength of the oxidation catalyst 13. Therefore, in an embodiment of the present invention, as an oxidation catalyst 13, a catalyst with a little carried amount of the precious metal catalyst, a catalyst carrying a base metal, or a catalyst with a small volume is used.

FIG. 3 schematically shows an oxidation reaction which is performed in the oxidation catalyst 13. As shown in FIG. 3, the hydrocarbons HC which are injected from the hydrocarbon feed valve 16 become radical hydrocarbons HC with few carbon atoms due to the catalyst 51. Note that, at this time, part of the hydrocarbons HC bond with the NO to become nitroso compounds such as shown in FIG. 3, while part of the hydrocarbons HC bond with $NO_2$ to form nitro compounds. These radical hydrocarbons etc. produced at the oxidation catalyst 13 are sent to the exhaust purification catalyst 14.

Figure 4:
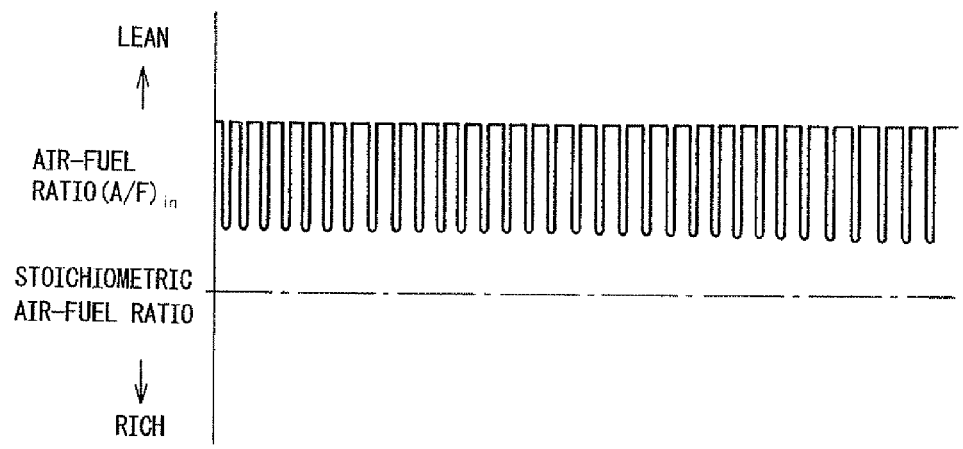
FIG. 4 is a view showing a change of an air-fuel ratio of exhaust gas flowing into an exhaust purification catalyst.
Figure 5:
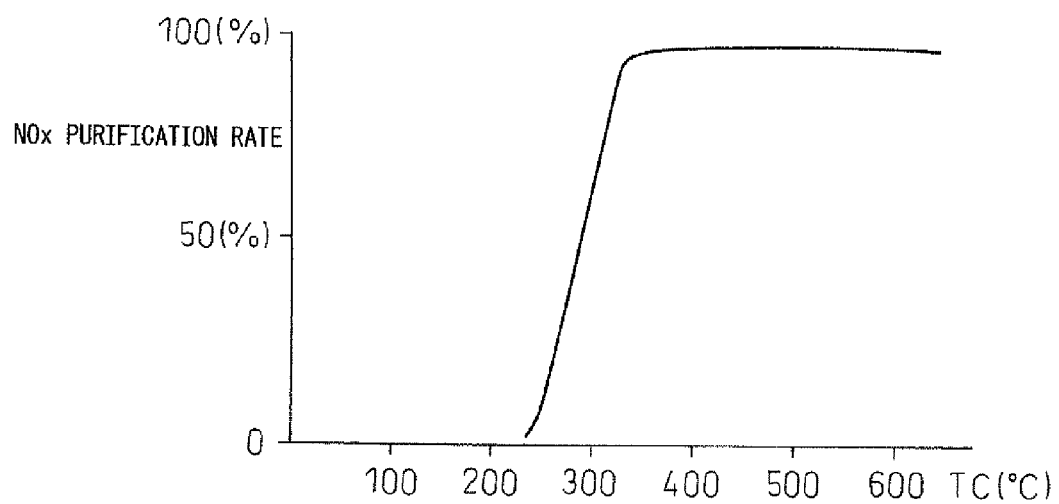
FIG. 5 is a view showing an $NO_x$ purification rate.

On the other hand, FIG. 4 shows the changes in the air-fuel ratio (A/F)in of the exhaust gas flowing into the exhaust purification catalyst 14, while FIG. 5 shows the $NO_x$ purification rate by the exhaust purification catalyst 14 at the time of changing the air-fuel ratio (A/F)in of the exhaust gas flowing into the exhaust purification catalyst 14, such as shown in FIG. 4, for the different catalyst temperatures TC of the exhaust purification catalyst 14. The inventors engaged in research on $NO_x$ purification over a long period of time and, in the process of research, learned that, as shown in FIG. 4, if intermittently lowering the air-fuel ratio (A/F)in of the exhaust gas flowing into the exhaust purification catalyst 14 by later explained certain time intervals within a range of a lean air-fuel ratio, an extremely high $NO_x$ purification rate is obtained even in a 400° C. or more high temperature region as shown in FIG. 5.

Furthermore, it was learned that, at this time, a large amount of a reducing intermediate containing nitrogen and hydrocarbons continues to be held or adsorbed on the surface of the basic layer 55, that is, on the basic exhaust gas flow surface part 56 of the exhaust purification catalyst 14, and this reducing intermediate plays a central role in obtaining a high $NO_x$ purification rate. Next, this will be explained while referring to FIGS. 6(A) and (B). Note that, these FIGS. 6(A) and 6(B) schematically show the surface part of the catalyst carrier 52 of the exhaust purification catalyst 14. These FIGS. 6(A) and 6(B), as shown in FIG. 4, show the reaction which is presumed to occur when the air-fuel ratio (A/F)in of the exhaust gas flowing into the exhaust purification catalyst 14 is intermittently reduced within the range of a lean air-fuel ratio.

That is, as will be understood from FIG. 4, the air-fuel ratio of the exhaust gas flowing into the exhaust purification catalyst 14 is maintained lean, so the exhaust gas which flows into the exhaust purification catalyst 14 becomes a state of oxygen excess. Therefore, the NO which is contained in the exhaust gas, as shown in FIG. 6(A), is oxidized on the platinum 53 and becomes $NO_2$. Next, this $NO_2$ is further oxidized and becomes stable nitrate ions $NO_3^-$.

On the other hand, when nitrates $NO_3^-$ are produced, the nitrates $NO_3^-$ are pulled back in a direction of reduction by the hydrocarbons HC which are sent on to the surface of the basic layer 55, have the oxygen disassociated, and become unstable $NO_2^*$. This unstable $NO_2$ * is strong in activity. Below, this unstable $NO_2^-$ is called the active $NO_2^*$. This active $NO_2^*$, as shown in FIG. 6(A), reacts with the mainly radical hydrocarbons HC which are adhered on the surface of the basic layer 55 or on the rhodium Rh 54 or the mainly radical hydrocarbons HC contained in the exhaust gas on the rhodium Rh 54, whereby a reducing intermediate is produced. This reducing intermediate is adhered or adsorbed on the surface of the basic layer 55.

Note that, at this time, the first produced reducing intermediate is considered to be a nitro compound R—NO2. If this nitro compound R—$NO_2$ is produced, the result becomes a nitrile compound R—CN, but this nitrile compound R—CN can only survive for an instant in this state, so immediately becomes an isocyanate compound R—NCO. If this isocyanate compound R—NCO is hydrolyzed, it becomes an amine compound R—$NH_2$. However, in this case, what is hydrolyzed is considered to be part of the isocyanate compound R—NCO. Therefore, as shown in FIG. 6(A), it is believed that the majority of the reducing intermediate which is held or adsorbed on the surface of the basic layer 55 is the isocyanate compound R—NCO and amine compound R—$NH_2$.

On the other hand, as shown in FIG. 6(B), the produced active $NO_2$ * reacts with the reducing intermediate R—NCO or R—$NH_2$ on the rhodium Rh 54 to form $N_2$, $CO_2$, and $H_2O$ and consequently the $NO_x$ is removed. That is, if no reducing intermediate R—NCO or R—$NH_2$ is held or adsorbed on the basic layer 55, the $NO_x$ is not removed. Therefore, to obtain a high $NO_x$ purification rate, it is necessary to ensure the continuous presence of a sufficient amount of the reducing intermediate R—NCO or R—$NH_2$ for making the produced active $NO_2$ * $N_2$, $CO_2$, and $H_2O$ on the basic layer 55, that is, the basic exhaust gas flow surface part 26, at all times.

That is, as shown in FIGS. 6(A) and 6(B), to oxidize the NO on the platinum Pt 53, the air-fuel ratio (A/F)in of the exhaust gas must be lean, and it is necessary to hold a sufficient amount of the reducing intermediate R—NCO or R—$NH_2$ for making the active $NO_2$ * produce $N_2$, $CO_2$, and $H_2O$ on the surface of the basic layer 55, that is, it is necessary to provide the basic exhaust gas flow surface part 26 for holding the reducing intermediate R—NCO or R—$NH_2$.

Therefore, in this embodiment according to the present invention, to react the $NO_x$ contained in the exhaust gas and the partially oxidized hydrocarbons and produce a reducing intermediate R—NCO or R—$NH_2$ containing nitrogen and hydrocarbon, precious metal catalysts 53 and 54 are carried on the exhaust gas flow surface of the exhaust purification catalyst 14. To hold the produced reducing intermediate R—NCO or R—$NH_2$ in the exhaust purification catalyst 14, a basic exhaust gas flow surface part 26 is formed around the precious metal catalysts 53 and 54. The $NO_x$ is reduced by the reducing action of the reducing intermediate R—NCO or R—$NH_2$ held on the basic exhaust gas flow surface part 26. Hydrocarbons HC are intermittently fed from the hydrocarbon feed valve 16 by predetermined feed intervals while maintaining the air-fuel ratio of the exhaust gas flowing into the exhaust purification catalyst 14 lean. The predetermined feed intervals of the hydrocarbons HC are made the feed intervals required for continuing to ensure the presence of the reducing intermediate R—NCO or R—$NH_2$ on the basic exhaust gas flow surface part 56.

In this case, when the amount of feed of hydrocarbons becomes somewhat excessive compared with the theoretical amount required for reducing the $NO_x$, the reducing intermediate R—NCO or R—$NH_2$ will continue to remain on the exhaust gas flow surface part 56. At this time, the $NO_x$ purification rate will become maximum. Therefore, in the present invention, the injection amount and the injection interval of hydrocarbons are set so that the feed amount of the hydrocarbons becomes somewhat excessive compared with the theoretical amount which is considered required for reduction of the $NO_x$ and therefore the reducing intermediate R—NCO or R—$NH_2$ continues to remain on the basic exhaust gas flow surface part 26. Incidentally, in the example shown in FIG. 4, the injection interval is made 3 seconds.

If the feed interval of the hydrocarbons HC is made longer than the above predetermined range of period, the hydrocarbons HC or the reducing intermediate R—NCO or R—NH$_2$ disappears from the surface of the basic layer 55. At this time, the nitrate ions NO$_3^-$ which were produced on the platinum Pt 53 are not acted on by a force pulling them back in a direction reducing the nitrate ions NO$_3^-$. Therefore, at this time, the nitrate ions NO$_3^-$ diffuse in the basic layer 55 as shown in FIG. 7(A) and become nitrates. That is, at this time, the NO$_x$ in the exhaust gas is absorbed in the form of nitrates inside of the basic layer 55.

On the other hand, FIG. 7(B) shows the case where the air-fuel ratio of the exhaust gas which flows into the exhaust purification catalyst 14 is made the stoichiometric air-fuel ratio or rich when the NO$_x$ is absorbed in the form of nitrates inside of the basic layer 55. In this case, the oxygen concentration in the exhaust gas falls, so the reaction proceeds in the opposite direction (NO$_3^-$→NO$_2$) and consequently the nitrates absorbed in the basic layer 55 gradually become nitrate ions NO$_3^-$ and, as shown in FIG. 7(B), are released from the basic layer 55 in the form of NO$_2$. Next, the released NO$_2$ is reduced by the hydrocarbons HC and CO contained in the exhaust gas.

FIG. 8 shows the case of making the air-fuel ratio (A/F) in of the exhaust gas which flows into the exhaust purification catalyst 14 temporarily rich slightly before the NO$_x$ absorption ability of the basic layer 55 becomes saturated. Note that, in the example shown in FIG. 8, the time interval of this rich control is 1 minute or more. In this case, the NO$_x$ absorbed in the basic layer 55 when the air-fuel ratio (A/F) in of the exhaust gas is lean, is released all at once from the basic layer 55 and reduced when the air-fuel ratio (A/F) in of the exhaust gas is temporarily made rich. Therefore, in this case, the basic layer 55 performs the role of an absorbent for temporarily absorbing NO$_x$. Note that, at this time, sometimes the basic layer 55 temporarily adsorbs the NO$_x$. Therefore, if using term of storage as a term including both absorption and adsorption, at this time, the basic layer 55 performs the role of an NO$_x$ storage agent for temporarily storing the NO$_x$.

That is, if the ratio of the air and fuel (hydrocarbons) which are fed into the engine intake passage, combustion chambers 2, and exhaust passage upstream of the exhaust purification catalyst 14 is called the air-fuel ratio of the exhaust gas, in this case, the exhaust purification catalyst 14 functions as an NO$_x$ storage catalyst which stores the NO$_x$ when the air-fuel ratio of the exhaust gas is lean and releases the stored NO$_x$ when the oxygen concentration in the exhaust gas falls.

FIG. 9 shows the NO$_X$ purification rate when making the exhaust purification catalyst 14 function as an NO$_X$ storage catalyst in this way. Note that, in FIG. 9, the abscissa indicates the catalyst temperature TC of the exhaust purification catalyst 14. When making the exhaust purification catalyst 14 function as an NO$_X$ storage catalyst, as shown in FIG. 9, when the catalyst temperature TC is 300° C. to 400° C., an extremely high NO$_X$ purification rate is obtained, but if the catalyst temperature TC becomes a 400° C. or greater high temperature, the NO$_x$ purification rate falls.

The NO$_X$ purification rate falls if the catalyst temperature TC becomes 400° C. or more in this way because when the catalyst temperature TC becomes 400° C. or more, the nitrates thermally break down and are released in the form of NO$_2$ from the exhaust purification catalyst 14. That is, so long as storing NO$_x$ in the form of nitrates, when the catalyst temperature TC is high, it is difficult to obtain a high NO$_x$ purification rate. However, with the new NO$_X$ purification method shown from FIG. 4 to FIGS. 6(A) and (B), as will be understood from FIGS. 6(A) and (B), nitrates are not produced or even if produced are very slight in amount, therefore, as shown in FIG. 5, a high NO$_X$ purification rate can be obtained even if the catalyst temperature TC is high.

That is, the NO$_x$ purification method which is shown from FIG. 4 to FIGS. 6(A) and 6(B) can be said to be a new NO$_x$ purification method designed to remove NO$_x$ without forming almost any nitrates in the case of using an exhaust purification catalyst which carries a precious metal catalyst and forms a basic layer which can absorb NO$_x$. In actuality, when using this new NO$_x$ purification method, only a very small amount of the nitrates are detected from the basic layer 55 compared with the case of using the NO$_x$ purification method employing NO$_X$ storage reduction shown in FIGS. 7(A) and 7(B).

Now, the inventors studied this new NO$_x$ purification method during which time they discovered that if making the air-fuel ratio of the combustion gas in the combustion chamber 2 temporarily rich, ammonia NH$_3$ flows out from the exhaust purification catalyst 14. The mechanism of generation of this ammonia is not necessarily clear, but probably the following such mechanism is used to generate ammonia NH$_3$.

Figure 10:
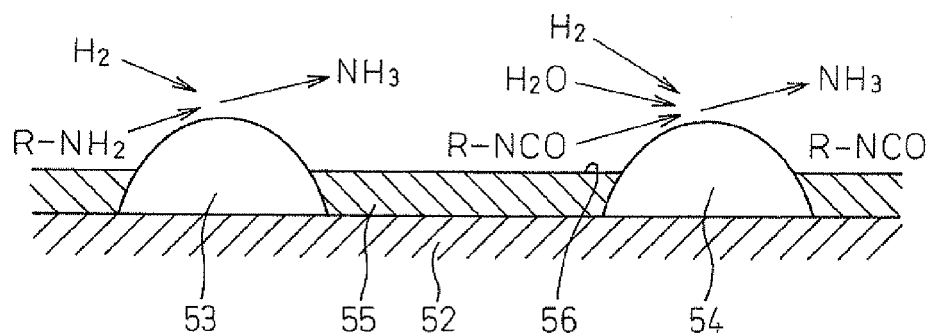
FIG. 10 is a view for explaining a reaction for generation of ammonia in an exhaust purification catalyst.

That is, if making the air-fuel ratio of the combustion gas inside of the combustion chamber 2 rich, that is, if burning the fuel in the combustion chamber 2 under insufficient oxygen, a large amount of carbon monoxide CO is produced. This carbon monoxide CO causes an aqueous gas producing reaction with the moisture contained in the exhaust gas on the precious metal catalyst 51 of the exhaust purification catalyst 13 (CO+H$_2$O→H$_2$O+CO$_2$). As a result, hydrogen H$_2$ is produced. This hydrogen H$_2$ reacts with the amine compound R—NH$_2$ which is held on the basic layer 53 of the exhaust purification catalyst 13 as shown in FIG. 10, consequently ammonia NH$_3$ is produced. Further, due to this hydrogen H$_2$, the hydrolysis action of the isocyanate compound R—NCO which is held on the basic layer 53 is promoted, consequently ammonia NH$_3$ is produced.

That is, when the air-fuel ratio of the exhaust gas is lean, even if hydrogen H$_2$ presents in the exhaust gas, this hydrogen H$_2$ will react on a priority basis with the oxygen in the exhaust gas compared with the basic intermediates R—NCO or R—NH$_2$ and therefore ammonia NH$_3$ will never be produced. However, when the air-fuel ratio of the combustion gas is made rich, if hydrogen H$_2$ is produced, this hydrogen H$_2$ becomes present in exhaust gas of a rich air-fuel ratio in which oxygen does not almost present. Therefore, at this time, the hydrogen H$_2$ will on the one hand react with the amine compound R—NH$_2$, while on the other hand will promote the hydrolysis action on the isocyanate compound R—NCO, so ammonia NH$_3$ will be produced In this way, to generate ammonia NH$_3$ in the exhaust purification catalyst 14 in this way, it is necessary to make the air-fuel ratio of the exhaust gas flowing to the exhaust purification catalyst 14 rich and make hydrogen be generated in the exhaust gas. That is, it is necessary to provide a hydrogen generating means for making the air-fuel ratio of the exhaust gas flowing into the exhaust purification catalyst 14 rich and generating hydrogen in the exhaust gas. One of this hydrogen generating means, as explained above, is the method for making the air-fuel ratio of the combustion gas in the combustion chambers 2 temporarily rich. One example for executing this method is shown in FIG. 11.

Figure 11:
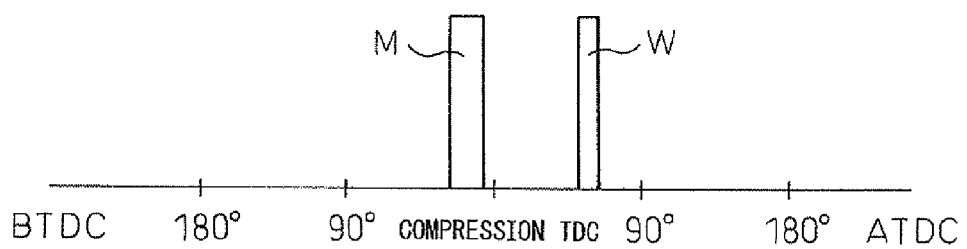
FIG. 11 is a view showing a fuel injection timing.

That is, in the example shown in FIG. 11, in addition to the combustion-use fuel M, an additional fuel W is injected to each combustion chamber 2 from the fuel injector 3, so as to burn fuel in an oxygen-poor state. That is, by injecting the additional fuel W, the combustion gas in the combustion chamber 2 becomes rich. As a result, the air-fuel ratio of the exhaust gas flowing into the exhaust purification catalyst 14 becomes rich and hydrogen is generated by an aqueous gas generating reaction. Note that the abscissa of FIG. 11 shows the crank angle. This additional fuel W is injected at a timing where it burns but does not appear as engine output, that is, slightly before ATDC90° after compression top dead center.

Now, if using the new $NO_X$ purification method according to the present invention, it is possible to obtain an extremely high $NO_X$ purification rate close to 100 percent over a wide temperature range of the exhaust purification catalyst 14. However, in this case, while saying the $NO_X$ purification rate is extremely high, it is not 100 percent. Therefore, a small amount of $NO_X$ is exhausted from the exhaust purification catalyst 14 without being removed.

Therefore, in the present invention, the phenomenon discovered by the inventors, that is, the fact that ammonia $NH_3$ can be generated in the exhaust purification catalyst 14, is utilized. The $NO_X$ selective reduction catalyst 15 for adsorbing and holding ammonia is arranged downstream of the exhaust purification catalyst 14 and the $NO_X$ which is exhausted from the exhaust purification catalyst 14 is reduced by the ammonia adsorbed at this $NO_X$ selective reduction catalyst 15. In this embodiment according to the present invention, this $NO_X$ selective reduction catalyst 15 is formed from Fe zeolite.

In this regard, to have the $NO_X$ selective reduction catalyst 15 reduce the $NO_X$ in this way, the $NO_X$ selective reduction catalyst 15 has to be made to adsorb the ammonia $NH_3$ at all times. Therefore, in the present invention, as will be understood from FIG. 12 showing the changes in the air-fuel ratio (A/F)in of the exhaust gas flowing into the exhaust purification catalyst 14, the air-fuel ratio (A/F)in of the exhaust gas flowing into the exhaust purification catalyst 14 is sometimes made rich to cause the exhaust purification catalyst 14 to generate ammonia $NH_3$ and this ammonia $NH_3$ is sent into the $NO_X$ selective reduction catalyst 15 so as to make it be adsorbed at the $NO_X$ selective reduction catalyst 15.

That is, in the present invention, on the exhaust gas flow surface of the exhaust purification catalyst 14, precious metal catalysts 53 and 54 are carried. Around the precious metal catalysts 53 and 54, the basic exhaust gas flow surface part 56 is formed. A hydrogen generating means is provided for making the air-fuel ratio of the exhaust gas flowing into the exhaust purification catalyst 14 rich and making hydrogen be produced in the exhaust gas. The exhaust purification catalyst 14 has the property of reducing the $NO_X$ which is contained in exhaust gas if hydrocarbons are injected by a predetermined feed period from the hydrocarbon feed valve 16 in a state where the air-fuel ratio of the exhaust gas flowing into the exhaust purification catalyst 14 is maintained lean, has the property of being increased in storage amount of $NO_X$ which is contained in exhaust gas if lengthening the feed period of the hydrocarbons from the predetermined feed period, and has the property of generating ammonia if hydrogen is fed in a state where the air-fuel ratio of the exhaust gas flowing into the exhaust purification catalyst 14 is rich.

Furthermore, in the present invention, an $NO_X$ selective reduction catalyst 15 which adsorbs and holds the ammonia generated at the exhaust purification catalyst 14, is arranged inside of the engine exhaust passage. At the time of engine operation, hydrocarbons are injected from the hydrocarbon feed valve 16 by the predetermined feed interval while maintaining the air-fuel ratio of the exhaust gas flowing into the exhaust purification catalyst 14 is lean. The hydrogen generating means is used to make the air-fuel ratio of the exhaust gas flowing into the exhaust purification catalyst temporarily rich and cause the generation of hydrogen in the exhaust gas by intervals longer than this predetermined feed interval. Due to this, $NO_X$ which is contained in the exhaust gas is reduced at the exhaust purification catalyst 14, and $NO_X$ which could not be reduced at the exhaust purification catalyst 14 is reduced by the ammonia which is adsorbed at the $NO_X$ selective reduction catalyst 15.

Figure 12:
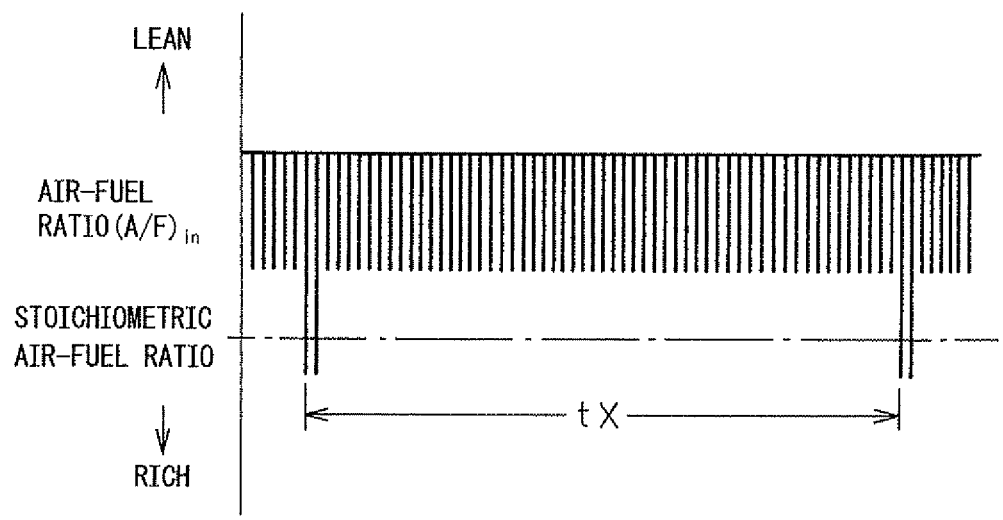
FIG. 12 is a time chart showing changes in the air-fuel ratio (A/F)in of the exhaust gas for executing the $NO_x$ purification control according to the present invention.
Figure 13:
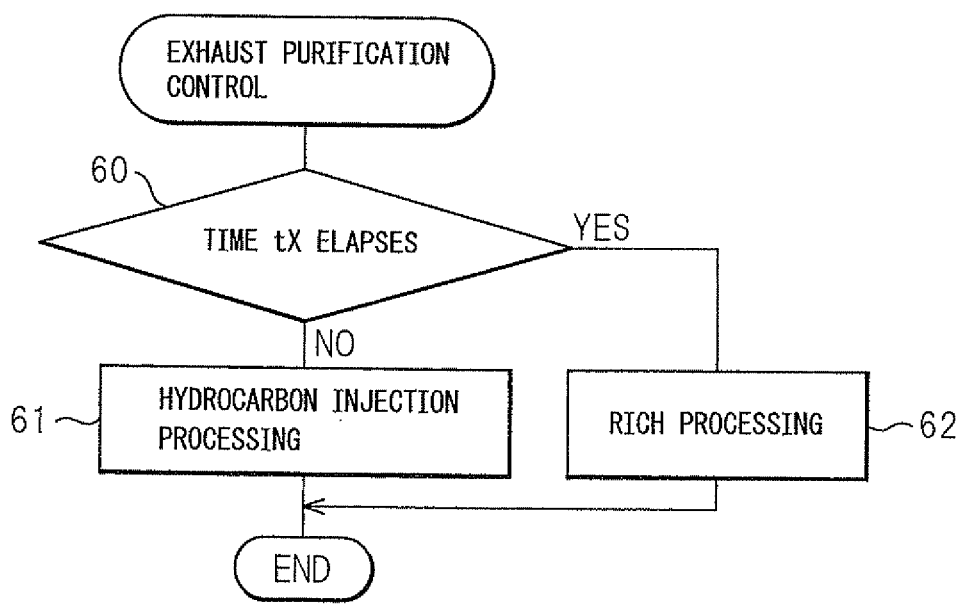
FIG. 13 is a flow chart for execution of the exhaust purification control shown in FIG. 12.

In the example shown in FIG. 12, each time a predetermined time tX elapses, the air-fuel ratio (A/F)in of the exhaust gas is made rich. FIG. 13 shows an exhaust purification control routine for executing the exhaust purification control shown in FIG. 12.

Figure 14:
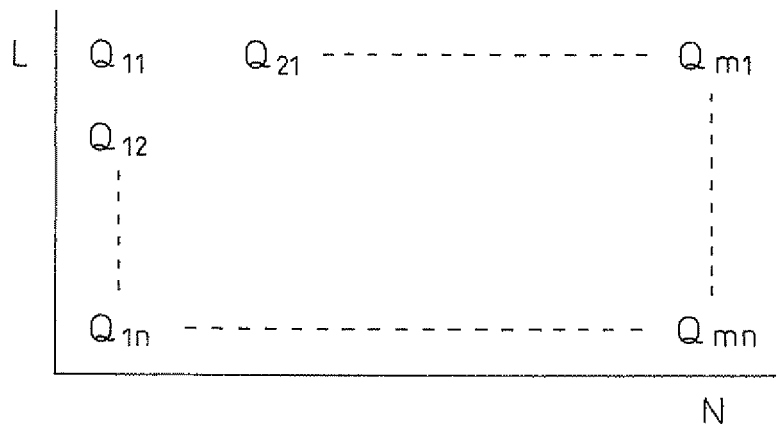
FIG. 14 is a view showing a map of a hydrocarbon feed amount Q.

Referring to FIG. 13, first, at step 60, it is judged if a time tX has elapsed from when the air-fuel ratio (A/F)in of the exhaust gas was made rich. When the time tX has not elapsed, the routine proceeds to step 61 where the action for injection of hydrocarbons from the hydrocarbon feed valve 16 is performed. The injection amount of hydrocarbons Q per unit time at this time, as shown in FIG. 14, is stored as a function of the engine load L and engine speed N in the form of a map in the ROM 32. The injection time or injection interval of the hydrocarbons is controlled so as to give this stored injection amount Q. At this time, the air-fuel ratio (A/F)in of the exhaust gas flowing into the exhaust purification catalyst 14 is intermittently decreased in the state where it is maintained lean, and thereby the $NO_X$ contained in the exhaust gas is reduced at the exhaust purification catalyst 14. The $NO_X$ which could not be reduced at the exhaust purification catalyst 14 is reduced at the $NO_X$ selective reduction catalyst 15 by the ammonia.

On the other hand, when, at step 60, it is judged that the time tX has elapsed after the air-fuel ratio (A/F)in of the exhaust gas is made rich, the routine proceeds to step 62 where, for example, additional fuel W is injected into the combustion chamber 2 and thereby the air-fuel ratio of the combustion gas is made rich. At this time, the ammonia $NH_3$ which was generated at the exhaust purification catalyst 14 is adsorbed at the $NO_X$ selective reduction catalyst 15. The time tX showing the intervals of rich control of the air-fuel ratio (A/F)in of the exhaust gas can be made constant or can be changed in accordance with the injection amount Q stored in the map shown in FIG. 14. Therefore, in the hydrogen generating means in the example shown in FIG. 12, the air-fuel ratio (A/F)in of the exhaust gas flowing into the exhaust purification catalyst 14 is temporarily made rich by predetermined intervals in accordance with the engine operating state, and hydrogen is made to be generated by the aqueous gas generating reaction.

Figure 15:
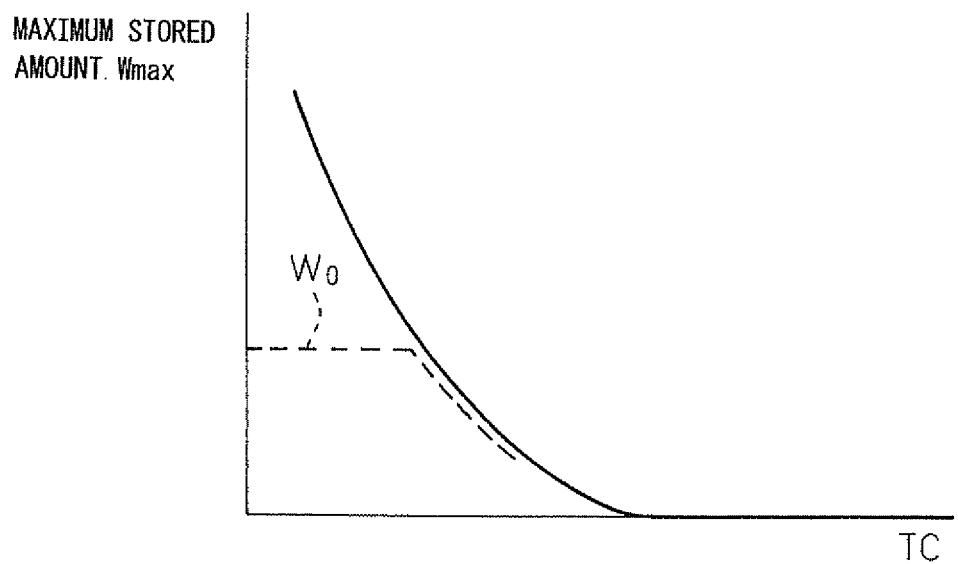
FIG. 15 is a view showing a storage amount of a reducing intermediate.
Figure 16:
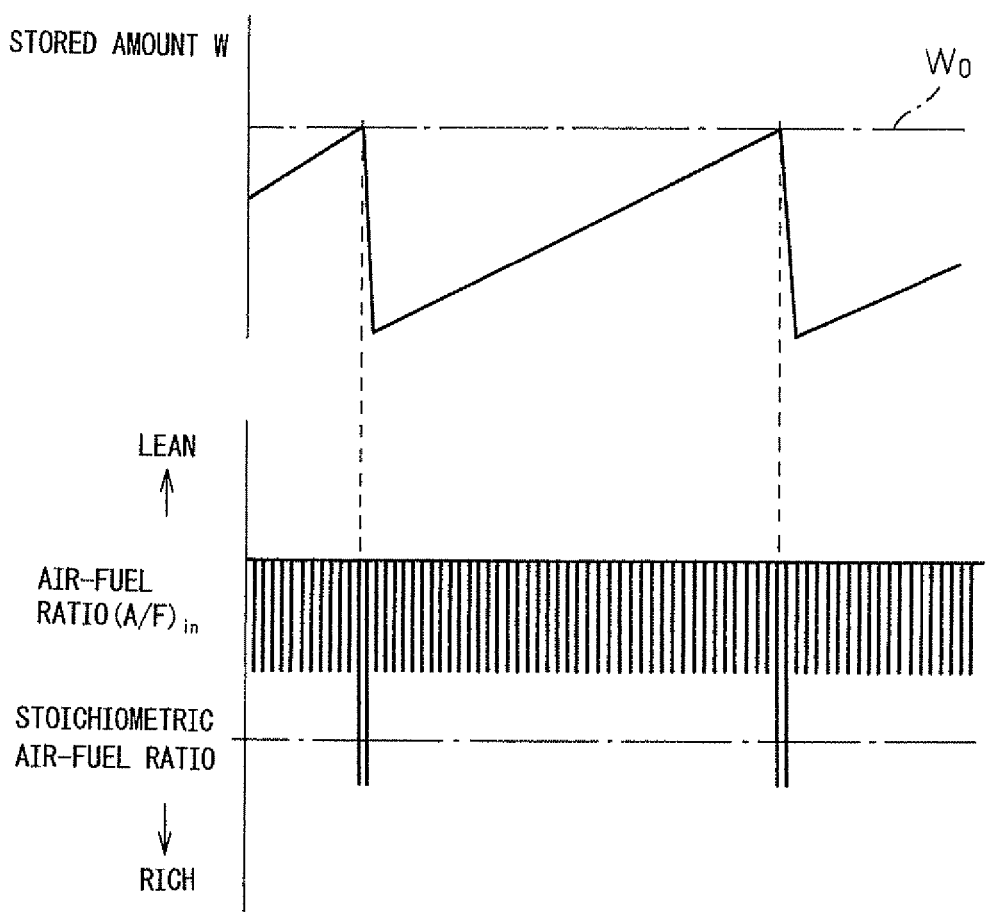
FIG. 16 is a time chart showing changes in the air-fuel ratio (A/F)in of the exhaust gas for executing another embodiment of the $NO_x$ purification control according to the present invention.
Figure 17:
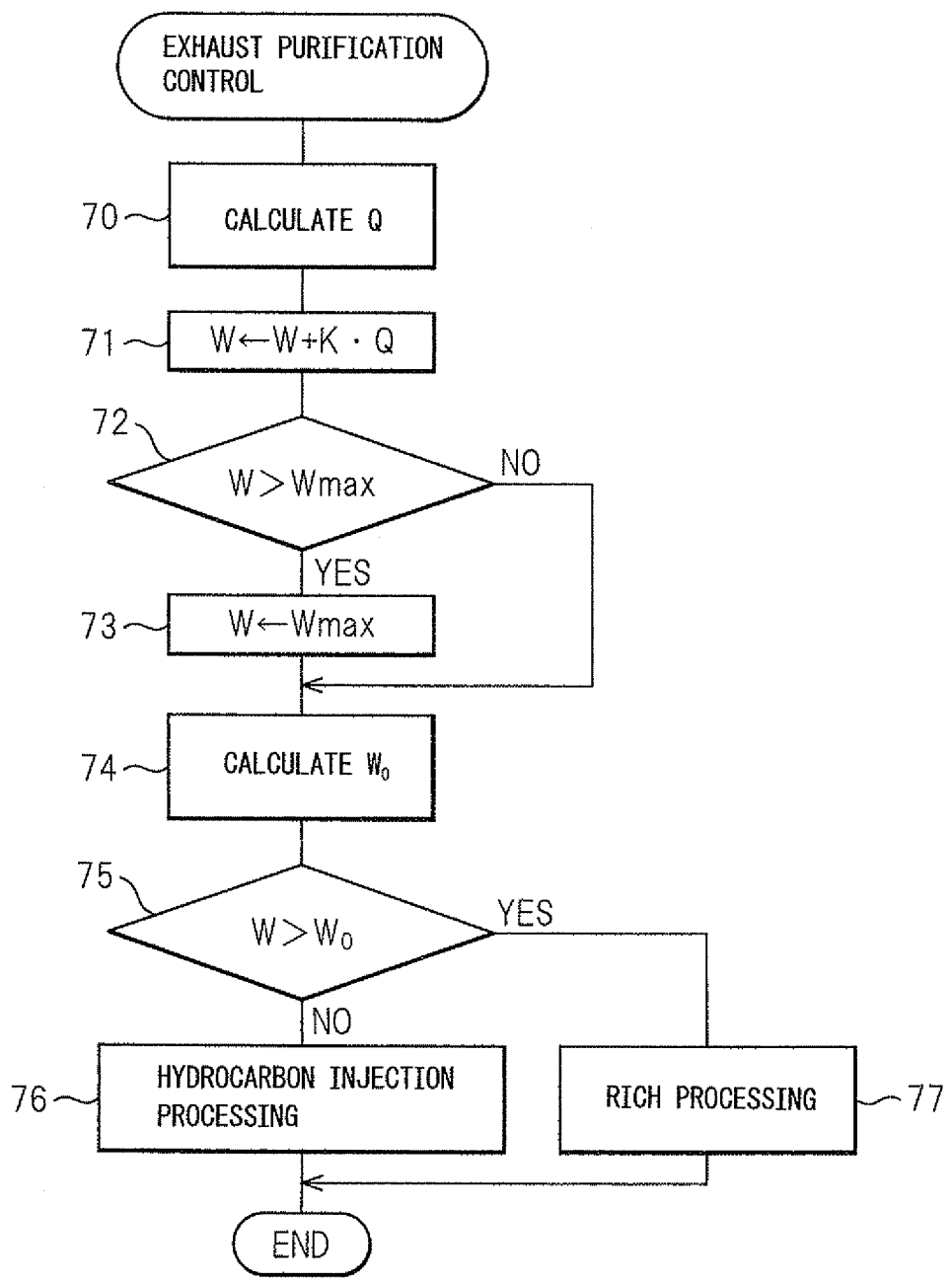
FIG. 17 is a flow chart for executing the exhaust purification control shown in FIG. 16.

FIG. 15 to FIG. 17 show another embodiment of the exhaust purification control.

As explained above, the $NO_X$ purification rate becomes the maximum when the amount of feed of hydrocarbons from the hydrocarbon feed valve 16 is somewhat excessive compared with the theoretical amount required for reduction of $NO_X$. Therefore, in the present invention, to obtain the maximum $NO_X$ purification rate, the amount of feed of hydrocarbons is made somewhat of an excess compared with the theoretical amount required for reducing the $NO_X$.

In this regard, if, in this way, the amount of feed of the hydrocarbons becomes somewhat of an excess compared with the theoretical amount required for reduction of the $NO_X$, the reducing intermediate R—NCO or R—$NH_2$ is also generated in excess. This excess reducing intermediate R—NCO or R—$NH_2$ is gradually stored in the exhaust purification catalyst 14 to an extent whereby the exhaust purification catalyst 14 can adsorb these reducing intermediates. In this regard, generally speaking, the maximum amount of adsorption in a catalyst, which has an adsorption ability, is increased the lower the temperature of the catalyst. The same may be said for the exhaust purification catalyst 14 in the present invention. That is, in the exhaust purification catalyst 14 as well, the lower the temperature of the exhaust purification catalyst 14 becomes, the greater the amount of adsorption of the reducing intermediate R—NCO or R—NH$_2$, that is, the greater the maximum storage amount.

In FIG. 15, the solid line shows the relationship between the maximum storage amount W$_{max}$ of the reducing intermediate which the exhaust purification catalyst 14 can store and the temperature TC of the exhaust purification catalyst 14. From FIG. 15, it will be understood that the lower the temperature TC of the exhaust purification catalyst 14, the more the maximum storage amount W$_{max}$ increases. Note that, if the catalyst temperature TC becomes higher, it is confirmed that the reducing intermediate R—NCO or R—NH$_2$ is not stored. Therefore, as shown in FIG. 15, if the catalyst temperature TC becomes higher, the maximum storage amount W$_{max}$ becomes zero.

In this way, in the present invention, the exhaust purification catalyst 14 stores the reducing intermediate R—NCO or R—NH$_2$ containing nitrogen and hydrocarbons and serving as the source of generation of ammonia. In this case, if the storage amount W of the reducing intermediate exceeds the maximum storage amount W$_{max}$, the amount by which the maximum storage amount W$_{max}$ is exceeded is wastefully consumed. Therefore, the storage amount W of the reducing intermediate has to be kept from exceeding the maximum storage amount W$_{max}$. Therefore, in this embodiment, as shown by the broken line in FIG. 15, an allowable value W$_0$ of a value smaller than the maximum storage amount W is determined in advance. When the storage amount W of the reducing intermediate exceeds this allowable value W$_0$, ammonia NH$_3$ is produced from the reducing intermediate.

That is, in this embodiment, a calculating means is provided for calculating the storage amount W of the reducing intermediate. As shown in FIG. 16, when the storage amount W of the reducing intermediate exceeds the predetermined allowable value W$_0$, the hydrogen generating means is used to make the air-fuel ratio (A/F)in of the exhaust gas flowing into the exhaust purification catalyst 14 temporarily rich and cause the generation of hydrogen.

FIG. 17 shows an exhaust purification control routine for executing the exhaust purification control shown in FIG. 16.

Referring to FIG. 17, first, at step 70, the injection amount of hydrocarbons Q per unit time is calculated from the map shown in FIG. 14. Next, at step 71, for example, by multiplying the injection amount Q with a constant K, the amount K·Q of the reducing intermediate R—NCO or R—NH$_2$ which is stored in the exhaust purification catalyst 14 per unit time is calculated, and this amount K·Q is added to the storage amount W of the reducing intermediate. Next, at step 72, it is judged if the storage amount W of the reducing intermediate exceeds the maximum storage amount W$_{max}$ shown by the solid line in FIG. 15. When W>W$_{max}$, the routine proceeds to step 73 where W=W$_{max}$, then the routine proceeds to step 74.

At step 74, the allowable value W$_0$ shown by the broken line in FIG. 15 is calculated. As will be understood from FIG. 15, this allowable value W$_0$ is a function of the catalyst temperature TC. Next, at step 75, it is judged if the storage amount W exceeds the allowable value W$_0$. When W≤W$_0$, the routine proceeds to step 76 where the injection amount of hydrocarbons Q per unit time calculated from the map of FIG. 14 is used as the basis for the action of injection of hydrocarbons from the hydrocarbon feed valve 16. At this time, the NO$_X$ which is contained in the exhaust gas is reduced in the exhaust purification catalyst 14, while the NO$_X$ which was not reduced at the exhaust purification catalyst 14 is reduced by the ammonia adsorbed at the NO$_X$ selective reduction catalyst 15.

On the other hand, when it is judged at step 75 that W>W$_0$, the routine proceeds to step 77 where, for example, the additional fuel. W is injected into the combustion chamber 2 whereby the air-fuel ratio of the combustion gas is made rich and the storage amount W is cleared. At this time, the ammonia NH$_3$ which was generated at the exhaust purification catalyst 14 is adsorbed at the NO$_X$ selective reduction catalyst 15.

Figure 18:
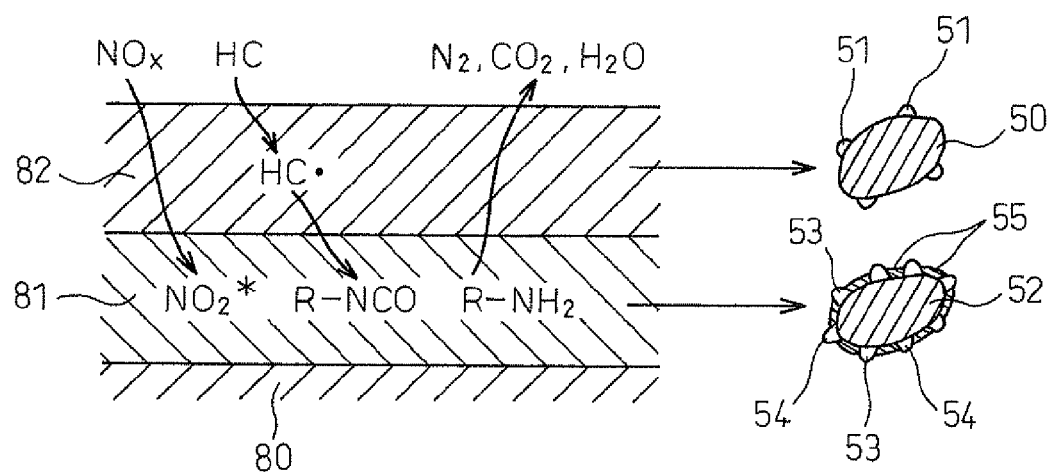
FIG. 18 is a partial enlarged cross-sectional view of another catalyst for removing $NO_x$.

FIG. 18 shows the case of forming the hydrocarbon partial oxidation catalyst 13 and the exhaust purification catalyst 14 shown in FIG. 1 by a single catalyst. This catalyst is for example provided with a large number of exhaust gas channels extending in the direction of flow of the exhaust gas. FIG. 18 shows an enlarged cross-sectional view of the surface part of the inner circumferential wall 80 of an exhaust gas channel of the catalyst. As shown in FIG. 18, on the surface of the inner circumferential wall 80 of the exhaust gas channel, a bottom coat layer 81 is formed. On this bottom coat layer 81, a top coat layer 82 is formed. In the example shown in FIG. 18, both the coat layers 81 and 82 are comprised of powder aggregates. FIG. 18 shows enlarged views of the powder forming the coat layers 81 and 82. From the enlarged views of the powder, it is learned that the top coat layer 82 is comprised of the hydrocarbon partial oxidation catalyst shown in FIG. 2(A), for example, an oxidation catalyst, while the bottom coat layer 81 is comprised of the exhaust purification catalyst shown in FIG. 2(B).

When the catalyst shown in FIG. 18 is used, as shown in FIG. 18, the hydrocarbons HC which are contained in the exhaust gas diffuse inside the top coat layer 82 and are partially oxidized. The partially oxidized hydrocarbons diffuse inside the bottom coat layer 81. That is, in the example shown in FIG. 18 as well, in the same way as the example shown in FIG. 1, the hydrocarbon partial oxidation catalyst and the exhaust purification catalyst are arranged so that the hydrocarbons which were partially oxidized at the hydrocarbon partial oxidation catalyst flow to the exhaust purification catalyst. On the other hand, the NO$_X$ which is contained in the exhaust gas diffuses to the inside of the bottom coat layer 81 and becomes active NO$_2$*. At this time, at the bottom coat layer 81, the reducing intermediate R—NCO or R—NH$_2$ is produced from the active NO$_2$ * and the partially oxidized hydrocarbons. Furthermore, the active NO$_2$ * reacts with the reducing intermediate R—HCO or R—NH$_2$ to become N$_2$, CO$_2$, and H$_2$O.

On the other hand, as shown in FIG. 2(B), on the catalyst carrier 52 of the exhaust purification catalyst 14, precious metals 53 and 54 are carried. Therefore, inside of the exhaust purification catalyst 14 as well, it is possible to reform the hydrocarbons to radical hydrocarbons HC with a small carbon number. In this case, if the hydrocarbons can be sufficiently reformed inside the exhaust purification catalyst 14, that is, if the hydrocarbons can be sufficiently partially oxidized inside of the exhaust purification catalyst 14, it is no longer necessary to arrange the oxidation catalyst 13 as shown in FIG. 1 upstream of the exhaust purification catalyst 14. Therefore, in an embodiment according to the present invention, no oxidation catalyst 13 is attached inside of the engine exhaust passage. Therefore, in this embodiment, the hydrocarbons which are injected from the hydrocarbon feed valve 16 are directly fed to the exhaust purification catalyst 14.

In this embodiment, the hydrocarbons which are injected from the hydrocarbon feed valve 16 are partially oxidized inside of the exhaust purification catalyst 14. Furthermore, inside of the exhaust purification catalyst 14, active $NO_2$* is produced from the $NO_X$ which is contained in the exhaust gas. Inside of the exhaust purification catalyst 14, the reducing intermediate R—NCO and R—$NH_2$ is produced from these active $NO_2$* and partially oxidized hydrocarbons. Furthermore, the active $NO_2$* reacts with the reducing intermediate R—NCO or R—$NH_2$ to become $N_2$, $CO_2$, and $H_2O$. That is, in this embodiment, the exhaust purification catalyst 14 for reacting the $NO_X$ contained in the exhaust gas and the hydrocarbons injected from the hydrocarbon feed valve 16 and partially oxidized is arranged inside of the engine exhaust passage downstream of the hydrocarbon feed valve 16.

Figure 19:
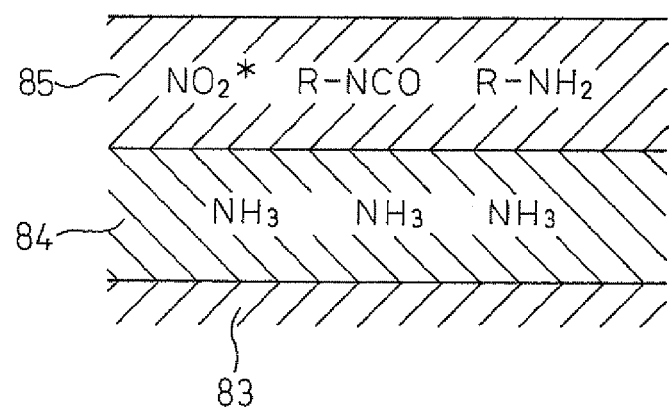
FIG. 19 is a partial enlarged cross-sectional view of another catalyst for removing $NO_x$.

FIG. 19 shows the case where the exhaust purification catalyst 14 and the $NO_X$ selective reduction catalyst 15 are formed from a single catalyst. This catalyst is also, for example, provided with a large number of exhaust gas channels which extend in the flow direction of the exhaust gas. FIG. 19 shows an enlarged cross-sectional view of the surface part of the inner circumferential walls 83 of the exhaust gas channels of this catalyst. As shown in FIG. 19, a bottom coat layer 84 is formed on the surface of the inner circumferential walls 83 of the exhaust gas channels. A top coat layer 85 is formed on the bottom coat layer 81. In the example shown in FIG. 19, both of the coat layers 84 and 85 are comprised of powder aggregates. In this catalyst, the bottom coat layer 84 is comprised of the $NO_X$ selective reduction catalyst 15, while the top coat layer 85 is comprised of the exhaust purification catalyst 14.

When the catalyst shown in FIG. 19 is used, the ammonia $NH_3$ which was generated inside the top coat layer 85 is adsorbed in the bottom coat layer 84, while the $NO_X$ which was not reduced at the top coat layer 85 is reduced by the ammonia adsorbed in the bottom coat layer 84. Note that, instead of the catalyst shown in FIG. 18 or FIG. 19, it is also possible to use a three-layer configuration catalyst including a bottom coat layer comprised of the $NO_X$ selective reduction catalyst 15, an intermediate coat layer comprised of the exhaust purification catalyst 14, and a top coat layer comprised of the hydrocarbon partial oxidation catalyst 13.

FIG. 20(A) shows an enlarged view of the vicinity of an exhaust pipe 12 in another embodiment, while FIG. 20(B) shows a cross-sectional view along the line B-B of FIG. 20(A). As shown in FIGS. 20(A) and (B), in this embodiment, the hydrocarbon partial oxidation catalyst 13 is comprised of a small-sized oxidation catalyst which is smaller in volume than the exhaust purification catalyst 14 and is run through by part of the exhaust gas flowing to the exhaust purification catalyst 14. The hydrocarbon feed valve 16 injects hydrocarbons toward the upstream side end face of this small-sized oxidation catalyst 13.

In the embodiment shown in FIGS. 20(A) and 20(B), the small-sized oxidation catalyst 13 has a substrate comprised of a laminated structure of flat thin metal sheets and corrugated thin metal sheets. On the surface of this substrate, for example, a layer of a catalyst carrier comprised of alumina is formed, while on the catalyst carrier, a precious metal such as platinum Pt or a transition metal such as silver Ag or copper Cu is carried. As will be understood from FIGS. 20(A) and 20(B), this small-sized oxidation catalyst 13 has a smaller cross-section than the total flow path cross-section heading toward the exhaust purification catalyst 14, that is, a smaller cross-section than the cross-section of the exhaust pipe 12, and has a tubular shape extending along the flow direction of the exhaust gas in the center of the exhaust pipe 12. Note that, in the embodiment shown in FIGS. 20(A) and 20(B), this small-sized oxidation catalyst 13 is arranged inside a cylindrical outer frame 90. This cylindrical outer frame 90 is supported by a plurality of stays 91 inside of the exhaust pipe 12.

In this embodiment as well, at the time of engine operation, usually hydrocarbons are injected from the hydrocarbon feed valve 16 at predetermined feed intervals while maintaining the air-fuel ratio of the exhaust gas flowing into the exhaust purification catalyst 14 lean. At this time, the $NO_X$ which is contained in the exhaust gas is reduced in the exhaust purification catalyst 14, while the $NO_X$ which was not reduced at the exhaust purification catalyst 14 is reduced by the ammonia adsorbed at the $NO_X$ selective reduction catalyst 15.

On the other hand, in this embodiment, when ammonia $NH_3$ should be generated in the exhaust purification catalyst 14, a large amount of hydrocarbons is injected from the hydrocarbon feed valve 16 toward the upstream end of the small-sized oxidation catalyst 13 so that the air-fuel ratio (A/F)in of the exhaust gas flowing into the exhaust purification catalyst 14 becomes rich. If such a large amount of hydrocarbons is injected from the hydrocarbon feed valve 16 toward the upstream end of the small-sized oxidation catalyst 13, the heat of oxidation reaction of the hydrocarbons causes the small-sized oxidation catalyst 13 to become a high temperature. As a result, the hydrocarbons which are injected from the hydrocarbon feed valve 16 is burned inside the small-sized oxidation catalyst 13 in an oxygen-poor state, therefore a large amount of carbon monoxide CO is produced.

If a large amount of carbon monoxide CO is produced, an aqueous gas generating reaction causes hydrogen $H_2$ to be generated and therefore ammonia $NH_3$ is generated at the exhaust purification catalyst 14. Further, if the small-sized oxidation catalyst 13 is fed hydrocarbons, a steam reformation action ($HC+H_2O \rightarrow H_2+ \ldots$) is used to produce hydrogen $H_2$. This hydrogen $H_2$ also enables ammonia $NH_3$ to be generated inside the exhaust purification catalyst 14.

In this way, in the hydrogen generating means according to this embodiment, the amount of hydrocarbons required for making the air-fuel ratio of the exhaust gas rich is fed from the hydrocarbon feed valve 16 whereby the hydrocarbons are burned inside of the engine exhaust passage. Due to this, the air-fuel ratio of the exhaust gas flowing into the exhaust purification catalyst 14 is made rich whereby hydrogen can be generated by an aqueous gas generating reaction or steam reformation action.

Note that, the small-sized oxidation catalyst 13 is small in size, so if hydrocarbons are fed to it, the heat of the oxidation reaction causes the temperature to rapidly rise and as a result the temperature of the exhaust gas which flows into the exhaust purification catalyst 14 rises. Therefore, when using a small-sized oxidation catalyst 14, there is the advantage that warmup of the exhaust purification catalyst 14 and $NO_X$ selective reduction catalyst 15 can be promoted.

REFERENCE SIGNS LIST

4 . . . intake manifold
5 . . . exhaust manifold
7 . . . exhaust turbocharger
12 . . . exhaust pipe
13 . . . hydrocarbon partial oxidation catalyst
14 . . . exhaust purification catalyst
15 . . . $NO_X$ selective reduction catalyst
16 . . . hydrocarbon feed valve

The invention claimed is:

1. An exhaust purification system of an internal combustion engine in which a hydrocarbon feed valve for feeding hydrocarbons is arranged inside of an engine exhaust passage, an exhaust purification catalyst for reacting $NO_x$ contained in exhaust gas and hydrocarbons injected from the hydrogen feed valve and partially oxidized is arranged inside of the engine exhaust passage downstream of the hydrocarbon feed valve, a precious metal catalyst is carried on an exhaust gas flow surface of the exhaust purification catalyst and a basic exhaust gas flow surface part is formed around the precious metal catalyst, hydrogen generating means is provided for making air-fuel ratio of an exhaust gas flowing into the exhaust purification catalyst rich and generating hydrogen in the exhaust gas, the exhaust purification catalyst has a property of reducing $NO_x$ contained in exhaust gas if hydrocarbons are injected by a predetermined feed period from the hydrocarbon feed valve in a state where the air-fuel ratio of the exhaust gas flowing into the exhaust purification catalyst is maintained lean and has a property of being increased in storage amount of $NO_x$ contained in exhaust gas if lengthening the feed period of the hydrocarbons from said predetermined feed period, the exhaust purification catalyst also has a property of generating ammonia if hydrogen is fed in a state where the air-fuel ratio of the exhaust gas flowing into the exhaust purification catalyst is rich, an $NO_x$ selective reduction catalyst which adsorbs and holds the ammonia generated at the exhaust purification catalyst is arranged inside of the engine exhaust passage, at the time of engine operation, hydrocarbons are injected from the hydrocarbon feed valve by said predetermined feed interval while maintaining the air-fuel ratio of the exhaust gas flowing into the exhaust purification catalyst lean, the air-fuel ratio of the exhaust gas flowing into the exhaust purification catalyst is temporarily rich and hydrogen is generated in the exhaust gas by intervals longer than said predetermined feed interval by said hydrogen generating means, and thereby $NO_x$ which is contained in the exhaust gas is reduced at the exhaust purification catalyst and $NO_x$ which could not be reduced at the exhaust purification catalyst is reduced by the ammonia which is adsorbed at the $NO_x$ selective reduction catalyst.

2. An exhaust purification system of an internal combustion engine as claimed in claim 1, wherein said exhaust purification catalyst and a hydrocarbon partial oxidation catalyst able to partially oxidize hydrocarbons injected from the hydrocarbon feed valve are arranged inside of the engine exhaust passage downstream of the hydrocarbon feed valve so that the hydrocarbons partially oxidized at the hydrocarbon partial oxidation catalyst flow into the exhaust purification catalyst.

3. An exhaust purification system of an internal combustion engine as claimed in claim 1, wherein said hydrocarbon partial oxidation catalyst is arranged inside of the engine exhaust passage upstream of said exhaust purification catalyst.

4. An exhaust purification system of an internal combustion engine as claimed in claim 3, wherein said hydrocarbon partial oxidation catalyst is comprised of a small-sized oxidation catalyst which is smaller in volume than said exhaust purification catalyst and through which part of the exhaust gas which flows into the exhaust purification catalyst runs and wherein hydrocarbons are injected from said hydrocarbon feed valve toward an upstream side end face of said small-sized oxidation catalyst.

5. An exhaust purification system of an internal combustion engine as claimed in claim 1, wherein a top coat layer comprised of said hydrocarbon partial oxidation catalyst is formed on a bottom coat layer comprised of said exhaust purification catalyst.

6. An exhaust purification system of an internal combustion engine as claimed in claim 1, wherein said precious metal catalyst causes the $NO_X$ contained in the exhaust gas and the partially oxidized hydrocarbons to react so as to form a reducing intermediate containing nitrogen and hydrocarbons, the produced reducing intermediate is held on the basic exhaust gas flow surface part, the $NO_X$ is reduced by a reducing action of the reducing intermediate held on the basic exhaust gas flow surface part, and the predetermined feed interval of the hydrocarbons is a feed interval required for ensuring a continued presence of the reducing intermediate on the basic exhaust gas flow surface part.

7. An exhaust purification system of an internal combustion engine as claimed in claim 1, wherein said $NO_X$ selective reduction catalyst is arranged downstream of said exhaust purification catalyst.

8. An exhaust purification system of an internal combustion engine as claimed in claim 1, wherein a top coat layer comprised of said exhaust purification catalyst is formed on a bottom coat layer comprised of said $NO_X$ selective reduction catalyst.

9. An exhaust purification system of an internal combustion engine as claimed in claim 1, wherein said precious metal catalysts are comprised of platinum Pt and at least one of rhodium Rh and palladium Pd.

10. An exhaust purification system of an internal combustion engine as claimed in claim 1, wherein on the exhaust gas flow surface of said exhaust purification catalyst, a basic layer is formed which includes an alkali metal, alkali earth metal, rare earth, or metal which can donate electrons to $NO_x$, and where the surface of said basic layer forms said basic exhaust gas flow surface part.

11. An exhaust purification system of an internal combustion engine as claimed in claim 1 wherein said hydrogen generating means makes the air-fuel ratio of the combustion gas in the combustion chambers rich so as to make the air-fuel ratio of the exhaust gas flowing into the exhaust purification catalyst rich and generates hydrogen by an aqueous gas generating reaction.

12. An exhaust purification system of an internal combustion engine as claimed in claim 1, wherein said hydrogen generating means feeds an amount of hydrocarbons required for making the air-fuel ratio of the exhaust gas rich from said hydrocarbon feed valve and makes the hydrocarbons burn inside of the engine exhaust passage so as to make the air-fuel ratio of the exhaust gas flowing into the exhaust purification catalyst rich and generate the hydrogen by an aqueous gas generating reaction or a steam reforming action.

13. An exhaust purification system of an internal combustion engine as claimed in claim 12, wherein a hydrocarbon partial oxidation catalyst is arranged inside of the engine exhaust passage upstream of said exhaust purification catalyst, said hydrocarbon partial oxidation catalyst is comprised of a small-sized oxidation catalyst which is smaller in volume than the exhaust purification catalyst and through which part of the exhaust gas flowing into the exhaust purification catalyst runs, and said hydrocarbon feed valve feeds hydrocarbons to said small-sized oxidation catalyst so as to make the air-fuel ratio of the exhaust gas flowing into the exhaust purification catalyst rich and generate hydrogen.

14. An exhaust purification system of an internal combustion engine as claimed in claim 1, wherein said hydrogen generating means temporarily makes the air-fuel ratio of the exhaust gas flowing into the exhaust purification catalyst rich and generates hydrogen by intervals predetermined in accordance with an engine operating state.

15. An exhaust purification system of an internal combustion engine as claimed in claim 1, wherein a reducing intermediate containing nitrogen and hydrocarbons and forming a source of generation of ammonia is stored in said exhaust purification catalyst, calculating means is provided for calculating a storage amount of said reducing intermediate, and said hydrogen generating means temporarily makes the air-fuel ratio of the exhaust gas flowing into the exhaust purification catalyst rich and generates hydrogen when the storage amount of the reducing intermediate exceeds a predetermined allowable value.

16. An exhaust purification system of an internal combustion engine as claimed in claim 2, wherein said precious metal catalyst causes the $NO_X$ contained in the exhaust gas and the partially oxidized hydrocarbons to react so as to form a reducing intermediate containing nitrogen and hydrocarbons, the produced reducing intermediate is held on the basic exhaust gas flow surface part, the $NO_X$ is reduced by a reducing action of the reducing intermediate held on the basic exhaust gas flow surface part, and the predetermined feed interval of the hydrocarbons is a feed interval required for ensuring a continued presence of the reducing intermediate on the basic exhaust gas flow surface part.

\* \* \* \* \*